United States Patent
Cahn (10) Patent No.: US 7,672,856 B1
(45) Date of Patent: Mar. 2, 2010

(54) METHOD FOR PRICING NETWORK BANDWIDTH SERVICES ON A VIRTUAL PRIVATE NETWORK

(75) Inventor: Robert Cahn, Carmel, NY (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1044 days.

(21) Appl. No.: 11/235,396

(22) Filed: Sep. 26, 2005

Related U.S. Application Data (62) Division of application No. 09/707,592, filed on Nov. 7, 2000, now abandoned.

(51) Int. Cl.
*G06Q 10/00* (2006.01)
*G06F 17/00* (2006.01)

(52) U.S. Cl. .................. 705/1; 705/400; 370/238; 455/445

(58) Field of Classification Search ............. 705/1, 705/400; 370/238; 455/445
See application file for complete search history.

(56) References Cited

OTHER PUBLICATIONS

Robert S. Cahn, Wide Area Network Desigh, 1998, Morgan Kaufmann Publishers, Inc.*
Semeria & Stewart, Optimizing Routing Software for Reliable Internet Growth, 2000, Juniper Networks.*
Semeria, Traffic Engineering for the New Public Network, 2000, Juniper Networks.*

* cited by examiner

*Primary Examiner*—Naresh Vig

(57) ABSTRACT

A computer method is disclosed for calculating an approximate cost of multi-protocol label switching (MPLS)-based virtual private network (VPN) services. The method computes a lower bound and an upper bound for the bandwidth used in an MPLS-based VPN. These are then combined to produce an estimate for the cost of the bandwidth.

2 Claims, 7 Drawing Sheets

THE STEP OF COMPUTING A GREATEST LOWER BOUND FOR THE BANDWIDTH USED IN AN MPLS-BASED VPN, COMPRISES THE STEPS OF:

(A) CREATING AN AUXILIARY GRAPH OF START AND FINISH NODES AND ONE NODE FOR EACH NODE IN THE VPN THAT IS SATURATED WITH INBOUND FLOW;

(B) CREATING A DIRECTED EDGE BETWEEN THE NODES REPRESENTING A LEAST COST OF ADDING FLOW FROM A NODE WHICH HAS FLOW LEFT TO PLACE, TO A NODE WHICH HAS CAPACITY TO RECEIVE THE FLOW;

(C) CALCULATING A SHORTEST PATH ALGORITHM TO FIND THE PATH FROM START AND FINISH NODES GIVING AN OPTIMAL WAY OF SERVING THE NODES THAT HAVE PREVIOUSLY UNSERVED UNITS OF FLOW; AND (D) OUTPUTTING L AS A GREATEST LOWER BOUND FOR THE BANDWIDTH USED.

THE STEP OF COMPUTING A LEAST UPPER BOUND FOR THE BANDWIDTH USED IN AN MPLS-BASED VPN, COMPRISES THE STEPS OF:

↓

(E) CREATING AN AUXILIARY GRAPH CONSISTING OF THE NODES START, FINISH, AND ONE NODE FOR EACH NODE IN THE VPN THAT IS SATURATED WITH INBOUND FLOW;

↓

(F) CREATING A DIRECTED EDGE BETWEEN THE NODES REPRESENTING A GREATEST COST OF ADDING FLOW FROM A NODE WHICH HAS FLOW LEFT TO PLACE, TO A NODE WHICH HAS CAPACITY TO RECEIVE THE FLOW;

↓

(G) CALCULATING A LONGEST PATH ALGORITHM TO FIND THE PATH FROM START TO FINISH, GIVING A WORST WAY OF SERVING THE NODES THAT HAVE PREVIOUSLY UNSERVED UNITS OF FLOW; AND

↓

(H) OUTPUTTING U AS A LEAST UPPER BOUND FOR THE BANDWIDTH USED.

↓

THE REMAINING STEP OF COMBINING THE UPPER BOUND AND THE LOWER BOUND TO PRODUCE AN ESTIMATE FOR THE COST OF THE BANDWIDTH, COMPRISES THE STEP OF:

↓

(I) SETTING A TOTAL-COST $\approx \alpha \times U + (1 - \alpha) \times L$ WHERE $\alpha$ IS A MEASURE OF RISK OF LOSING MONEY BY CARRYING A GIVEN CUSTOMER'S VPN.

METHOD FOR PRICING NETWORK BANDWIDTH SERVICES ON A VIRTUAL PRIVATE NETWORK

This application is a divisional application of prior U.S. patent application Ser. No. 09/707,592 filed Nov. 7, 2000 now abandoned which is incorporated herein by reference.

BACKGROUND OF THE INVENTION

This disclosure relates, in general, to a computer method. More particularly, this disclosure relates to a computer method for the analysis of communications networks that approximates the total cost of network bandwidth services on a Virtual Private Network.

BACKGROUND OF THE INVENTION

The operating cost for a digital telephony network is relatively easy to determine when the network operator implements the network at the physical layer. The total cost is the sum of the cost of the hardware and the cost of the link. The cost of the hardware (e.g., switches, routers, or multiplexers) is a combination of the depreciated value of the hardware purchase price and the hardware maintenance charges. The cost of the link depends on whether the network operator leases or owns the trunk lines. If the network operator leases the lines, the cost of the link is the sum of the monthly lease rate for the line. If the network operator owns the lines, the cost of the link is the depreciated purchase price of the line.

A Virtual Private Network (VPN) shares resources, such as the facilities of a public network, with other virtual private networks. The VPN maintains privacy by encapsulating the VPN messages in packets or frame relay frames to separate the messages from those of other VPNs that share the same public network. Tunneling involves the process of using encapsulation to carry one protocol over another. Encrypting the messages in the packets can further enhance the privacy of the VPN messages. Additional discussion of virtual private networks is provided in the book by David E. McDysan entitled "VPN Applications Guide", published by John Wiley & Sons, 2000.

Replacement of the physical links with Virtual Circuits is a subsequent advance in technology that allows a telephony service provider to easily construct a network. A Permanent Virtual Circuit (PVC) uses a fixed logical channel to maintain a permanent association between data terminals. Since PVCs do not require a setup operation before sending data nor a disconnect operation after sending data, a new connection between the same users may route messages along a different path. The Virtual Circuits derive bandwidth from multiplexers using Time Division Multiplexing or by connections through a Frame Relay or Asynchronous Transfer Mode (ATM) switch. The latter case usually involves a published tariff, such as, the cost to maintain the physical network connection, set-up fees, teardown fees, or usage fees. There are various ways to optimize a Permanent Virtual Circuit (PVC) such as by sharing a single access line. The total cost to operate the network, however, is still relatively easy to determine.

Recent technology advances allow a telephony service provider to construct a Virtual Private Network (VPN) that does not include any PVCs. Instead, each node in the network has a Committed Access Rate (CAR) for ingress and egress traffic. The network does not require a destination for the traffic, but the traffic must remain within the VPN. As long as the traffic obeys the flow rate limitations specified by the CAR, the node will maintain a certain quality of service, that is, loss and delay.

Multi-Protocol Label Switching (MPLS) is an emerging Internet Engineering Task Force (IETF) standard for constructing a data packet transit network. An MPLS network moves data packets from an ingress node to an egress node and relies upon conventional routers using legacy Local Area Network techniques to deliver the data packets to the end systems. In the MPLS network protocol, each incoming packet includes a label that has an appearance similar to a packet header. As the packets traverse the label switch path, each node along that path makes a forwarding decision for the packet based solely on the contents of the label. As each node forwards a packet, the network strips the existing label from the message and adds a new label that provides forwarding instructions for the next node on the label switch path. The MPLS standard, dated Aug. 10, 2000, is available on the IETF Web site at http://www.ietforg/internet-drafts/draft-ietf-mpls-arch-07.txt. Additional discussion of MPLS is provided in the book by Bruce S. Davie et al., entitled "MPLS: Technology and Applications", published by Morgan Kaufmann Publishers, 2000.

MPLS enables the creation of "virtual circuits", or tunnels, across an Internet Protocol (IP) network. These virtual circuits make is possible to use MPLS to provision VPN services such as traffic engineering. Using MPLS for a VPN provides traffic isolation, much like an Asynchronous Transfer Mode (ATM) or frame relay service. A description of a method for applying using MPLS to provision a VPN on an IP network is available as a Request For Comment (RFC) document on the IETF Web site at http://www.ietf.org/rfc/rfc2547.txt.

In a MPLS VPN, there is a committed access rate (CAR) for both the inbound and outbound traffic from each site. The destination of this traffic is unspecified, but the traffic must remain within the VPN. The VPN customer contracts for VPN service within the limits specified by the CAR. The provider of the VPN on a public network must price this service to meet the competitive conditions of the market place and to recover the provider's investment in the infrastructure of the network. The problem to solve is to develop a way to establish a price for the bandwidth that each VPN customer uses, knowing only the access rates, not the destination of the traffic.

SUMMARY OF THE INVENTION

The invention disclosed herein is a computer method for approximating the total cost of the network bandwidth services on a Virtual Private Network that employs Multi-Protocol Label Switching technology. The algorithm computes a greatest lower bound and a least upper bound for the network bandwidth services. The invention uses these bounds to approximate the total cost of the network bandwidth services.

The process for computing a greatest lower bound for the bandwidth used in a VPN that uses MPLS, includes the steps of:
  (a) Creating an auxiliary graph of Start and Finish nodes and one node for each node in the VPN that is saturated with inbound flow;
  (b) Creating a directed edge between the nodes representing a least cost of adding flow from a node having flow left to place to a node having capacity to receive the flow (looping for all edges thus created);
  (c) Calculating a shortest path algorithm to find the path from the Start node to the Finish node that gives the optimal way of serving the previously unserved unit of flow; and (d) Outputting L as a greatest lower bound for the bandwidth used.

The process for computing in a separate calculation a least upper bound for the bandwidth used in a VPN that uses MPLS, includes the steps of:

(e) Creating an auxiliary graph consisting of the nodes Start, Finish, and one node for each node in the VPN that is saturated with inbound flow;

(f) Creating a directed edge between the nodes representing a greatest cost of adding flow from a node having flow left to place to a node having capacity to receive the flow (looping for all edges thus created);

(g) Calculating a longest path algorithm to find the path from Start to Finish, giving a worst way of serving the previously unserved unit of flow; and (h) Outputting U as a least upper bound for the bandwidth used.

The process for combining the upper bound and the lower bound to produce an estimate for the cost of the bandwidth, includes the step of:

(i) Setting a Total_cost≈α×U+(1−α)×L where α is a measure of risk of losing money by carrying a given customer's VPN.

DESCRIPTION OF THE PREFERRED EMBODIMENTS

The invention is a computer method for approximating the total cost of the network bandwidth services on a Virtual Private Network (VPN) that employs Multi-Protocol Label Switching (MPLS) technology. A computer system for carrying out the method of the invention is a standard general-purpose data processor that includes a random access memory to store the program embodiment of the invention and a central processor to execute the instructions in the program embodiment. The computer system accesses databases that store the characteristics of the MPLS-based VPN networks analyzed by the computer method invention. The computer system also connects to a billing network to report the total cost of the network bandwidth services on the MPLS-based VPN networks analyzed by the computer method invention. The billing network can connect to a banking system that debits payments from a VPN customer's network services account.

Figure 1:
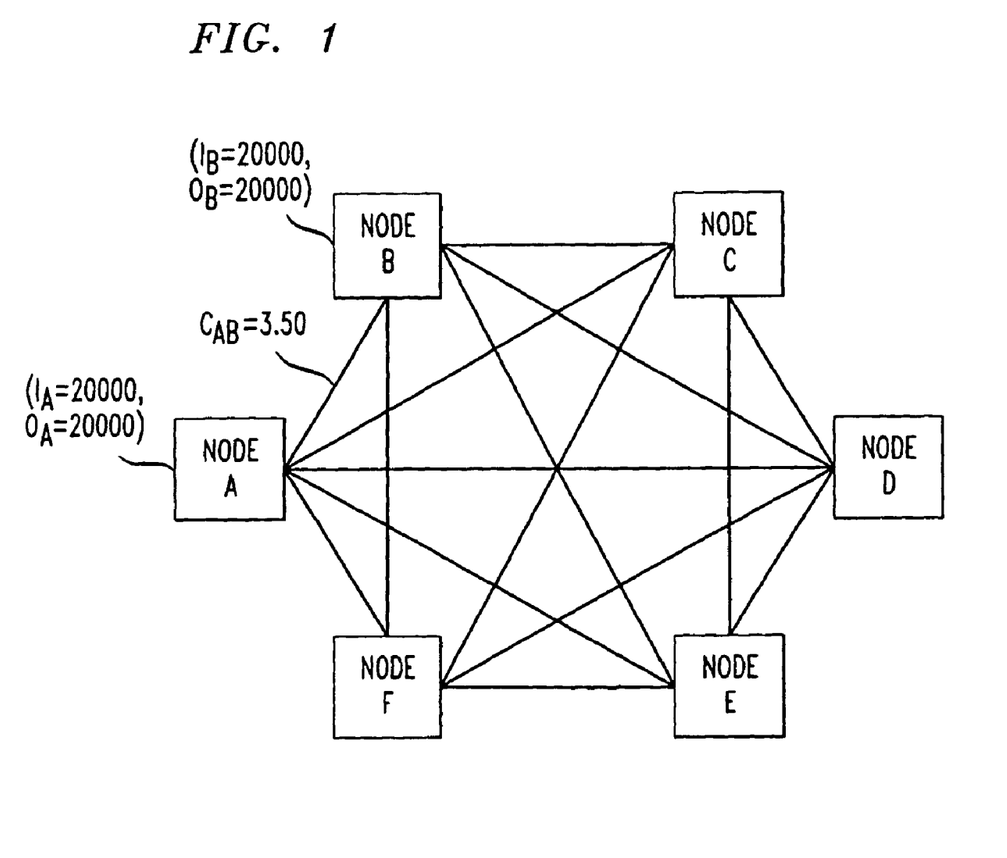
FIG. 1 is a diagram of a complete weighted graph of a six node MPLS-based VPN network.

FIG. 1 is a diagram of a complete weighted graph that is an example of an MPLS-based VPN with six nodes that the computer method invention will analyze. Each of the network nodes labeled A, B, C, D, E, F, and G, has a possible communications path to every other node of the network. Each node is characterized by two values, an ingress flow rate capacity I, and an egress flow rate capacity O, which are expressed in units such as kilobits per second (Kbps). Node A, for example, has an ingress flow rate capacity $I_A$=20000 Kbps, and an egress flow rate capacity $O_A$=20000 Kbps. Node B, for example, has an ingress flow rate capacity $I_B$=20000 Kbps, and an egress flow rate capacity $O_B$=20000 Kbps. The path between node A and node B, which is called an edge, has a data transfer cost $c_{AB}$ associated with it, which is expressed in units of dollars per Kbps. The data transfer cost $c_{AB}$ associated with the edge from node A to node B in this example is $c_{AB}$=$3.50 per Kbps. Table I gives ingress flow rate capacity I and an egress flow rate capacity O for the network nodes labeled A, B, C, D, E, F, and G. Table 2 gives the data transfer cost for each of the possible communications paths between network nodes A, B, C, D, E, F, and G.

Graph theory is well known in the art, and is described for example in the book by Frank Harary entitled "Graph Theory", published by Addison-Wesley, 1969. Using graph theory notation, a graph G is a pair $$G=(V,E),$$

where V is a finite set of nodes or vertices and E is a finite set that has as elements subsets of V of cardinality two called edges. The vertices of V are usually called $v_1, v_2, \ldots$. By way of example, FIG. 1 depicts a network that represents the graph $$G=(, \{[v_A,v_B],[v_A,v_C],[v_A,v_D],[v_A,v_E],[v_A,v_F],[v_B,v_C], [v_B,v_D],[v_B,v_E],[v_B,v_F],[v_C,v_D],[v_C,v_E],[v_C,v_F],\}$$

Weighted graphs are also known in the art. A graph G is a weighted graph if there is a real number associated with the edges in the graph. The weight of the edge from vertex $v_1$ to vertex $v_2$ is denoted as $w_{12}$. By way of example, FIGS. 2(a), 2(b), and 2(c) depict the network as a weighted graph.

It is further known in the art that a graph G with n vertices in which each vertex is connected to each of the remaining vertices with one edge between each pair of vertices is a complete graph.

The model of the network for the preferred embodiment is a complete weighted graph $$G=(V, (E, w_E, c_E)),$$

where V is a finite set of network nodes, E is a finite set of edges (i.e., links) that connect pairs of nodes in set V, $w_E$ represents the Administrative Cost associated with each link in set E, and $c_E$ is the cost per bit associated with each element of set E. If the network contains any parallel links, the model will collapse the parallel links into a single link with the associated costs for that single link equal to the sum of the cost of the parallel links.

The Administrative Cost for a network link is used to make routing decisions and is usually set by the network operator based upon the recommendations of the hardware manufacturer. The cost per bit for a network link is a function of the operating point of the link and the recurring costs for the link. For example, the cost per bit for a T1 link (maximum transfer capacity of 1,536,000 bits per second) between vertices $v_1$ and $v_2$ that is 65% utilized, only accommodates traffic flow in one direction, and costs $2200 per month is $$c_{12} = \frac{\$2200}{1{,}536{,}000 \text{ bits} \times 0.65}.$$

If that same link can accommodate traffic in both directions, the cost per bit is $$c_{12} = \frac{\$2200 \times 2}{1{,}536{,}000 \text{ bits} \times 0.65}.$$

The network for the preferred embodiment is a Virtual Private Network with a finite set of ingress rates I and egress rates O for each network node. At any particular time t, the traffic T being sent from node $vpn_i$ to $vpn_j$ is denoted as $T_{i,j}(t)$. In dealing with stationary traffic, the traffic is denoted as $T_{i,j}$. For any given pattern of the $T_{i,j}$ that satisfies the inequalities $$\sum_i T_{i,j} < I_j, \text{ and } \sum_j T_{i,j} < O_i.$$

The total cost of the flow is represented as:

$$\text{Total Cost} = \sum_{i,j} T_{i,j} \times C_{i,j}$$

where, $C_{i,j}$ is the sum of the cost per bit for each link on the shortest path from $vpn_i$ to $vpn_j$ as determined by the Administrative Cost for each edge.

In the preferred embodiment, approximating the Total Cost requires calculating the least upper bound $U_{min}$ and greatest lower bound $L_{max}$ such that $$\text{Total Cost} \approx (\alpha \times U_{min}) + ((1-\alpha) \times L_{max})$$

where the choice of $\alpha$ is a business decision for the telephony service provider. For larger values of $\alpha$, the business decreases the risk of losing money by carrying a given customer's VPN services and increases the risk that they will lose the contract to an aggressive competitor who undercuts their bid for the VPN services. For smaller values of $\alpha$, the more the risks are reversed. The business must determine the value of $\alpha$ by instrumenting the VPNs and determining the actual value of $\alpha$ for a particular segment of the customer community. For example, if a telephony service provider determines that $\bar{\alpha}=0.4$ with a variance of 0.1 for a given customer segment, a business decision to offer a new customer who is a member of that segment a price quote based upon $\alpha=0.4$ would be based on a reasonable confidence that any error in the calculation will be modest.

In the network model of the preferred embodiment, the calculation of the least upper bound $U_{min}$ and greatest lower bound $L_{max}$ is determined by solving, respectively, the longest and shortest path through the network.

Figure 2:
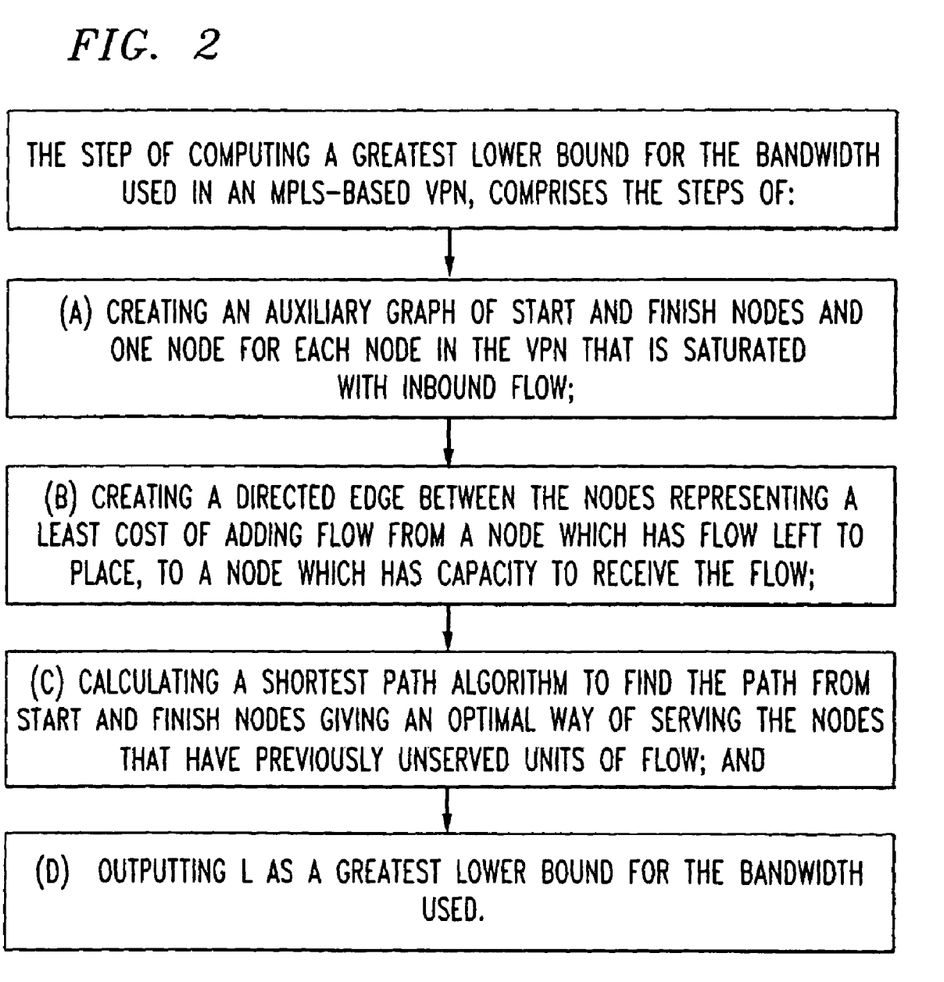
FIG. 2 is a flow diagram of the steps in determining a greatest lower bound for the bandwidth used in an MPLS-based VPN network.
Figure 2A:
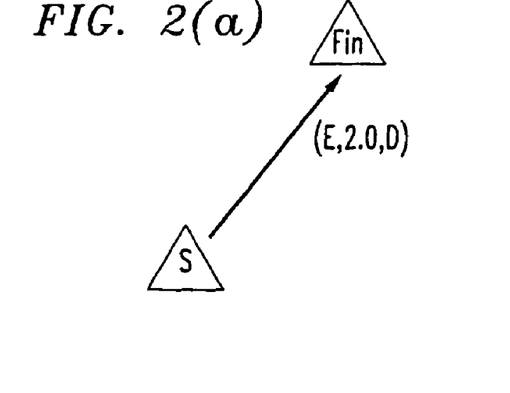
FIG. 2(a) shows the start node "S" and the finish node "Fin" of the auxiliary graph for the first iteration in determining L as a greatest lower bound for the bandwidth used.
Figure 2B:
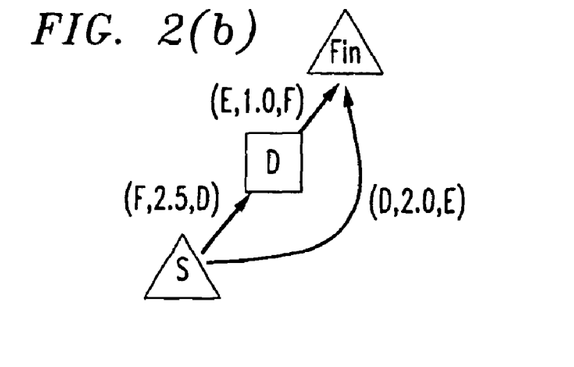
FIG. 2(b) shows the start node "S", the intermediate node "D" and the finish node "Fin" of the auxiliary graph for the second iteration in determining L as a greatest lower bound for the bandwidth used.
Figure 2C:
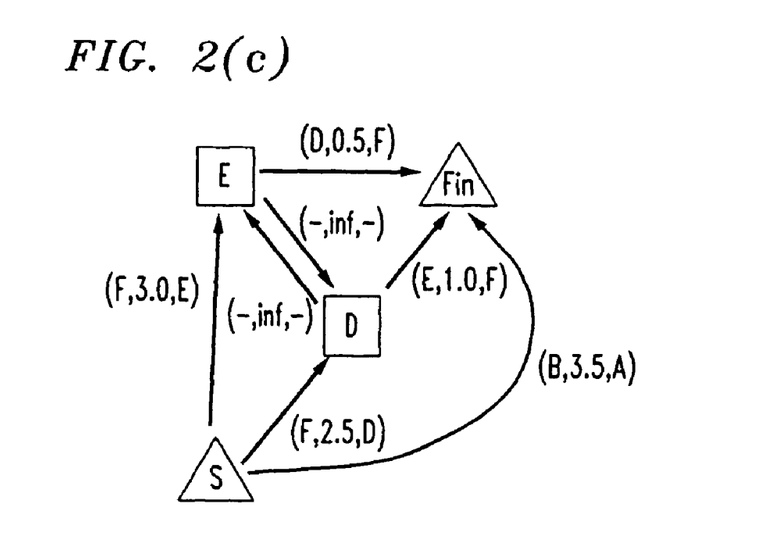
FIG. 2(c) shows the start node "S", intermediate nodes "D" and "E", and the finish node "Fin" of the auxiliary graph for the third iteration in determining L as a greatest lower bound for the bandwidth used.

The computer method invention for approximating the total cost of the network bandwidth services on a VPN that employs MPLS, begins with determining a greatest lower bound for the bandwidth used, as shown in the flow diagram of FIG. 2.

The general process of computing a greatest lower bound for the bandwidth used in an MPLS-based VPN, as shown in the flow diagram of FIG. 2, comprises the steps of:

(A) Creating an auxiliary graph of Start and Finish nodes and one node for each node in the VPN that is saturated with inbound flow;

(B) Creating a directed edge between the nodes representing a least cost of adding flow from a node which has flow left to place, to a node which has capacity to receive the flow (looping for all edges thus created);

(C) Calculating a shortest path algorithm to find the path from Start and Finish nodes giving an optimal way of serving the nodes that have previously unserved units of flow; and (D) Outputting L as a greatest lower bound for the bandwidth used.

The details of calculating the Greatest Lower Bound (Lmax), are as follows.

The calculation of the greatest lower bound is performed with a digital computer programmed to execute the following steps:

1. Initialize the Lower Bound $L_{max}$ to 0.

2. Initialize the ingress flow and egress flow for each node in the VPN to 0.

[a] Create an auxiliary graph that consists of a Start node, a Finish node, and each node in the VPN that has a saturated ingress flow.

[b] Create a directed edge between every node in the auxiliary graph on the path from Start to Finish (looping for all edges thus created).

[c] The directed edge from Start to Finish has the label (k, $c_{kl}$, l) and weight $c_d$ that represents the least cost of adding flow from $vpn_k$ (which has flow remaining to place) to $vpn_l$ (which has the capacity to receive flow).

[d] The directed edge from Start to saturated node $vpn_I$ has the label (k, $c_{kI}$, I) and weight $c_{kI}$, that represents the least cost of adding from $vpn_k$ (which has flow remaining to place) to the saturated node $vpn_I$ (which has the capacity to receive flow).

[e] The directed edge from saturated node $vpn_I$ to saturated node $vpn_J$ has the label (k, ($c_{kJ}-c_{kI}$), J) and weight ($c_{kJ}-c_{kI}$) that represents the increased least cost of moving a unit of traffic from the saturated node $vpn_I$ to the saturated node $vpn_J$.

[f] Run a Shortest Path algorithm to determine the path from Start to Finish that provides the optimal way of serving the previously unserved unit of flow.

[g] Calculate L' as the sum of the cost for each edge in the path from Start to Finish. Add L' to the current value of $L_{max}$.

[h] Destroy the Auxiliary graph created in step [a] above.

[3] Repeat steps [2] until all of the demand in the system is allocated.

[4] Output $L_{max}$ and terminate.

The following example calculates the greatest lower bound in a VPN that has six nodes (A, B, C, D, E, and F). Table 1 describes the ingress and egress flow rates for each node. Table 2 describes the cost matrix for transferring 1 kilo-bit of data traffic in one second between nodes in the VPN.

TABLE 1

Ingress and Egress Flow Rates in the VPN.

| Node | Ingress Flow Rate | Egress Flow Rate |
|---|---|---|
| A | 20000 | 20000 |
| B | 20000 | 20000 |
| C | 20000 | 20000 |
| D | 10000 | 10000 |
| E | 10000 | 10000 |
| F | 10000 | 10000 |

TABLE 2

Data Transfer Costs ($/kbps) to Compute L

| Node | A | B | C | D | E | F |
|---|---|---|---|---|---|---|
| A | ∞ | 3.50 | 5.50 | 4.00 | 6.00 | 8.00 |
| B | 3.50 | ∞ | 9.00 | 8.00 | 3.70 | 8.00 |
| C | 5.50 | 9.00 | ∞ | 7.00 | 6.00 | 7.50 |
| D | 4.00 | 8.00 | 7.00 | ∞ | 2.00 | 3.50 |
| E | 6.00 | 3.70 | 6.00 | 2.00 | ∞ | 3.00 |
| F | 8.00 | 8.00 | 7.50 | 3.50 | 3.00 | ∞ |

After initializing the lower bound and the ingress flow and egress flow for each node in the VPN, the digital computer program creates the auxiliary graph depicted in FIG. 2(a). FIG. 2(a) shows the start node "S" and the finish node "Fin". The digital computer program creates a directed edge from node E (Start) to node D (Finish) and assigns a 10 kbps traffic flow rate to that edge. Since the shortest path is from node E to node D, $$L' = \frac{\$2.00}{kbps}$$

×10 kbps=$20.00. The value of L after the first iteration through the algorithm is $20.00.

Since the first iteration saturated the ingress flow to node D, the digital computer program creates the auxiliary graph depicted in FIG. 2(b) for the second iteration. FIG. 2(b) shows the start node "S", the intermediate node "D" and the finish node "Fin". The digital computer program creates a directed edge from node D (Start) to node E (Finish) and assigns a 10 kbps traffic flow rate to that edge. In addition, the digital computer program creates directed edges from node F to node D and from node E to node F. The path through node D has a cost of $3.50 while the path from node D to node E only has a cost of $2.00. Thus, $$L' = \frac{\$2.00}{kbps}$$

×10 kbps=$20.00 and the value of L after the second iteration through the algorithm is $40.00.

Since the first and second iterations saturated the ingress flow to node D and E, the digital computer program creates the auxiliary graph depicted in FIG. 2(c) for the third iteration. FIG. 2(c) shows the start node "S", intermediate nodes "D" and "E", and the finish node "Fin". This auxiliary graph consists of seven directed edges. Two of the edges, node D to node E and node E to node D, have weight ∞ because the flow into the one node originates from the other node and the disclosed network model does not allow for traffic flow from a node onto itself. The auxiliary graph depicted in FIG. 2(c) has three shortest paths. At this point, the algorithm's course is implementation dependent. In the preferred embodiment, the algorithm chooses to add 20 Kbps of traffic flow from node B to node A. Thus, $$L' = \frac{\$3.50}{kbps}$$

×20 kbps=$70.00 and the value of L after the third iteration through the algorithm is $110.00.

The algorithm continues through a four additional iterations each time saturating the ingress flow into another node and adding another node to the auxiliary graph. In the fourth iteration, for example, the auxiliary graph consists of the nodes Start, D, E, A, and Finish. Table 3 summarizes the results after each iteration. After completion of the iterations, the value of L is the optimal flow because each step in the iteration produced an optimal flow.

TABLE 3

Summary of the Iterations in the Example for Computing the Lower Bound

| Iteration | # of Nodes in the Auxiliary Graph | Flow Rate (Directed Edge) Added | L' | L |
|---|---|---|---|---|
| 1 | 2 | 10K (D to E) | 20 | 20 |
| 2 | 3 | 10K (E to D) | 20 | 40 |
| 3 | 4 | 20K (B to A) | 70 | 110 |
| 4 | 5 | 20K (A to B) | 70 | 180 |
| 5 | 6 | −10K (E to D) 10K (E to F) 10K (F to D) | 35 | 215 |
| 6 | 7 | −10K (E to F) 10K (E to C) −10K (D to E) 10K (D to F) 10K (C to A) | 90 | 305 |
| 7 | 7 | −10K (B to A) 10K (B to C) 10K (C to A) | 110 | 415 |

The general method of the invention for approximating the total cost of the network bandwidth services on a VPN that employs MPLS, continues by determining a least upper bound for the bandwidth used. This is generally shown in FIG. 3.

Figure 3:
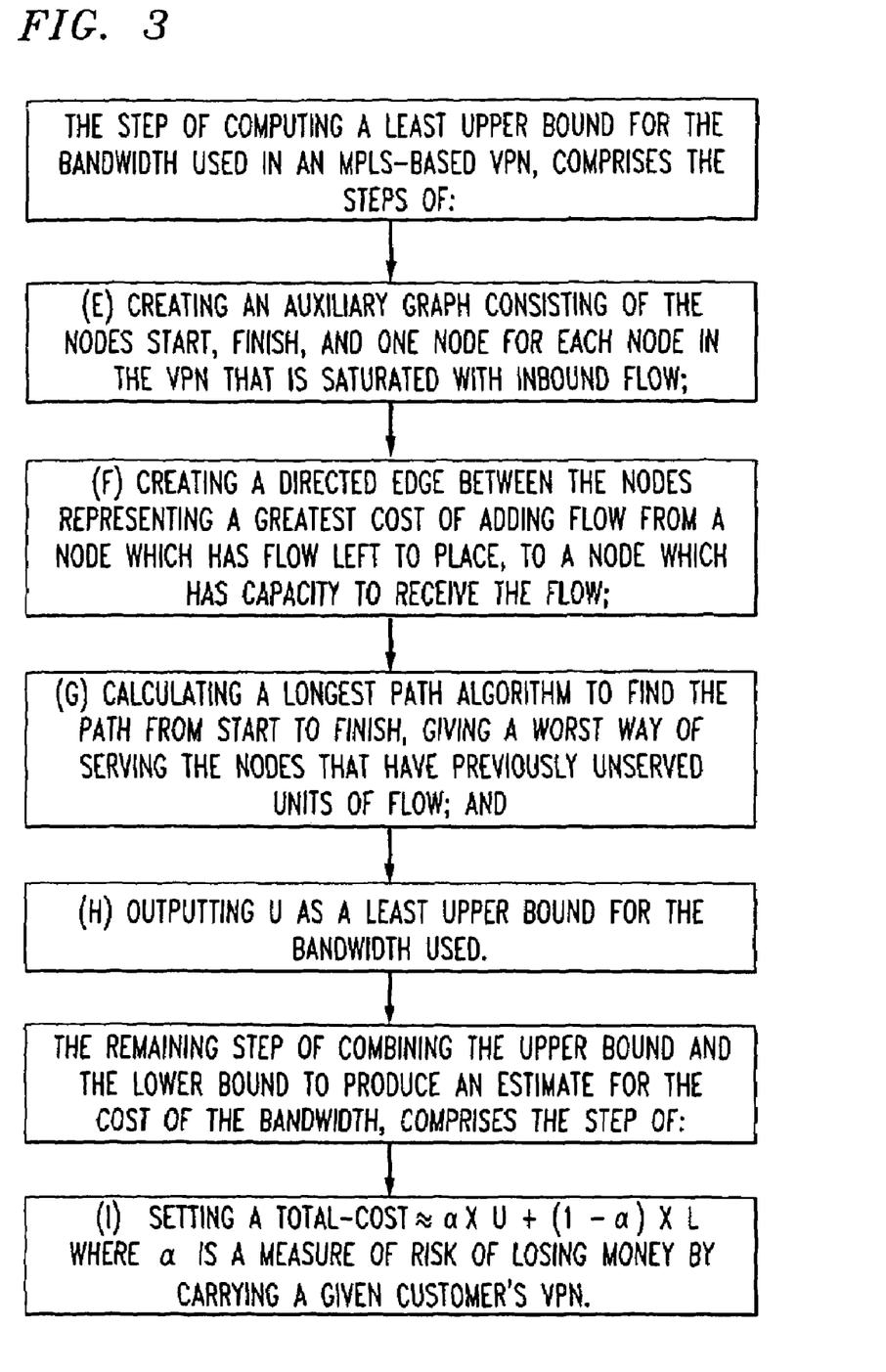
FIG. 3 depicts the steps in determining a least upper bound for the bandwidth used in an MPLS-based VPN network.

The general process of computing a least upper bound for the bandwidth used in an MPLS-based VPN, as shown in FIG. 3, comprises the steps of:
 (E) Creating an auxiliary graph consisting of the nodes Start, Finish, and one node for each node in the VPN that is saturated with inbound flow;
 (F) Creating a directed edge between the nodes representing a greatest cost of adding flow from a node which has flow left to place, to a node which has capacity to receive the flow (looping for all edges thus created);

(G) Calculating a longest path algorithm to find the path from Start to Finish, giving a worst way of serving the nodes that have previously unserved units of flow; and (H) Outputting U as a least upper bound for the bandwidth used.

FIG. 3 also shows the remaining step of combining the upper bound and the lower bound to produce an estimate for the cost of the bandwidth, which is the following step of (I) setting a Total_cost≈α×U+(1−α)×L where α is a measure of risk of losing money by carrying a given customer's VPN.

The value of Total_cost is output by the computer to a billing network to report the total cost of the network bandwidth services on the MPLS-based VPN networks being analyzed by the computer method invention. The billing network can be connected to a banking system, for example, that debits payments from a VPN customer's network services account.

The details of calculating the Least Upper Bound ($U_{min}$) are as follows:

The calculation of the least upper bound is similar to the calculation of the greatest upper bound, however, the cost matrix is modified to set the cost of the diagonal terms to 0, not ∞. Table 4 contains the cost matrix for calculating U.

TABLE 4

Data Transfer Costs ($/kbps) to Compute U

| Node | A | B | C | D | E | F |
|---|---|---|---|---|---|---|
| A | 0 | 3.50 | 5.50 | 4.00 | 6.00 | 8.00 |
| B | 3.50 | 0 | 9.00 | 8.00 | 3.70 | 8.00 |
| C | 5.50 | 9.00 | 0 | 7.00 | 6.00 | 7.50 |
| D | 4.00 | 8.00 | 7.00 | 0 | 2.00 | 2.50 |
| E | 6.00 | 3.70 | 6.00 | 2.00 | 0 | 3.00 |
| F | 8.00 | 8.00 | 7.50 | 2.50 | 3.00 | 0 |

The calculation of U is performed with a digital computer programmed to execute the following steps:

1. Initialize the Upper Bound U to 0.

2. Initialize the ingress flow and egress flow for each node in the VPN to 0.

[a] Create an auxiliary graph that consists of a Start node, a Finish node, and each node in the VPN that has a saturated ingress flow.

[b] Create a directed edge between every node in the auxiliary graph on the path from Start to Finish.

[c] The directed edge from Start to Finish has the label (k, $c_{kl}$, l) and weight $c_{kl}$ that represents the greatest cost of adding flow from $vpn_k$ (which has flow remaining to place) to $vpn_l$ (which has the capacity to receive flow).

[d] The directed edge from Start to saturated node $vpn_l$ has the label (k, $c_{kl}$, l) and weight $c_{kl}$ that represents the greatest cost of adding from $vpn_k$ (which has flow remaining to place) to the saturated node $vpn_l$ (which has the capacity to receive flow).

[e] The directed edge from saturated node $vpn_l$ to saturated node $vnp_J$ has the label (k, ($c_{jK}-c_{kJ}$),J) and weight ($c_{kJ}-c_{kJ}$) that represents the decreased greatest cost of moving a unit of traffic from the saturated node $vpn_i$ to the saturated node $vpn_J$

[f] Run a Longest Path algorithm to determine the path from Start to Finish that provides the least optimal way of serving the previously unserved unit of flow.

[g] Calculate U' as the sum of the cost for each edge in the path from Start to Finish. Add U' to the current value of $U_{min}$.

[h] Destroy the Auxiliary graph created in step [a] above.

3. Repeat steps 2 until all of the demand in the system is allocated.

4. Output $U_{min}$, and terminate.

The computer method invention for approximating the total cost of the network bandwidth services on a VPN that employs MPLS, is completed by combining the upper bound and the lower bound to produce an estimate for the cost of the bandwidth. This is done by the step of:

setting a Total_cost≈α×U+(1−α)×L where α is a measure of risk of losing money by carrying a given customer's VPN.

This algorithm is demonstrated by tracing through some of the steps.

Figure 3A:
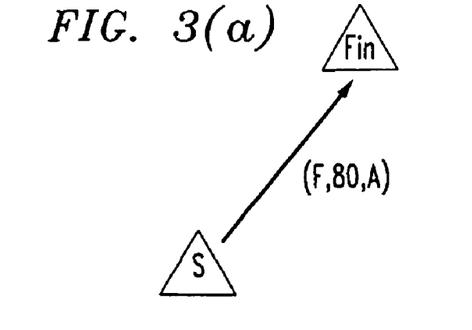
FIG. 3(a) shows the start node "S" and the finish node "Fin" of the auxiliary graph for the first iteration in determining U as a least upper bound for the bandwidth used.
Figure 3B:
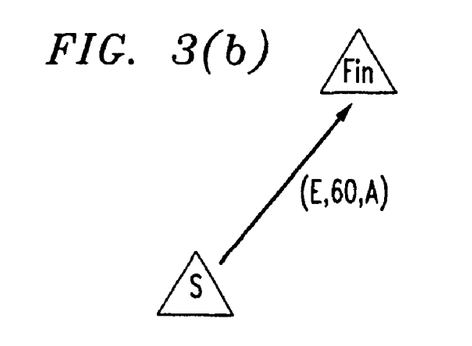
FIG. 3(b) shows the start node "S" and the finish node "Fin" of the auxiliary graph for the second iteration in determining U as a least upper bound for the bandwidth used.

In the first auxiliary graph of FIG. 3(a) the edge is labeled from S to Fin with a label of (F, 80, A). Notice that since the cost of going to B is the same, it is possible to also use the label (F, 80, B). At the end of this step, U=80. The second auxiliary graph of FIG. 3(b) also has the same node set since A can terminate 20 Kpbs of flow. The edge is given the label (E, 60, C)) and after this step, U=140.

Figure 3C:
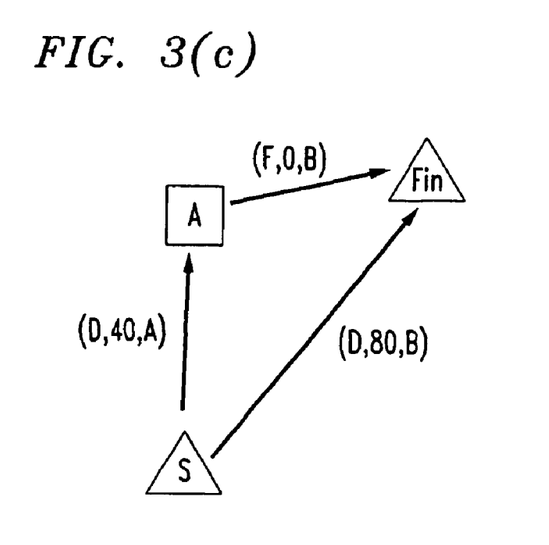
FIG. 3(c) shows the start node "S", intermediate node "A", and the finish node "Fin" of the auxiliary graph for the third iteration in determining U as a least upper bound for the bandwidth used.
Figure 3D:
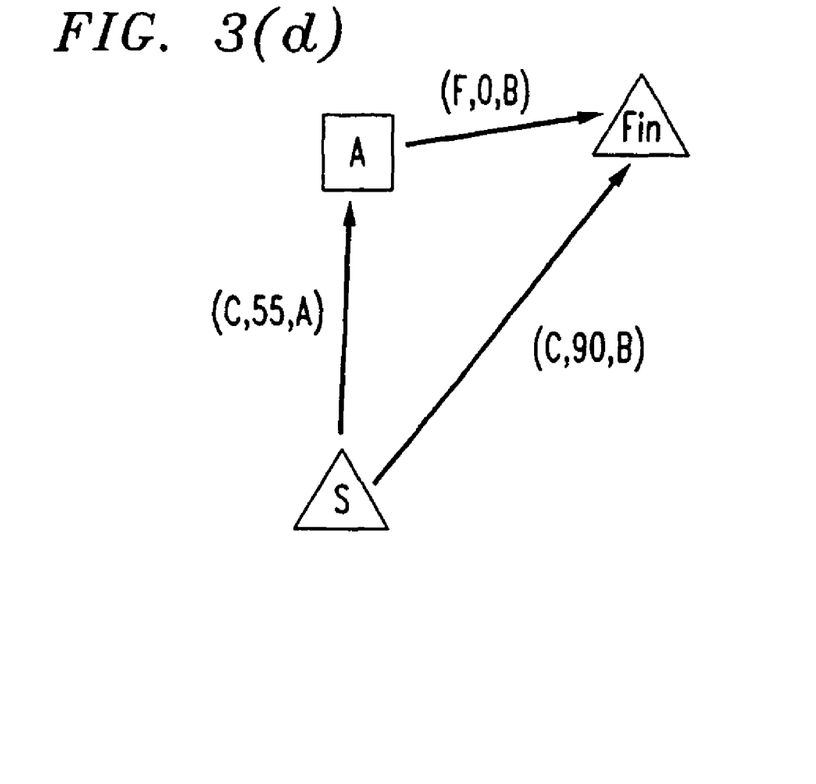
FIG. 3(d) shows the fourth iteration where flow is added from C to B.
Figure 3E:
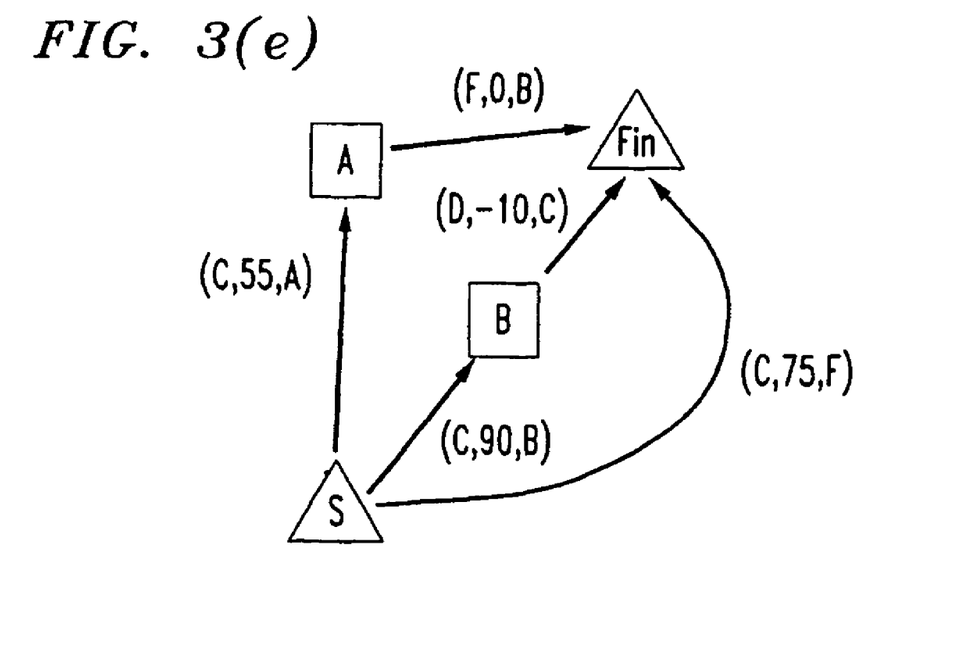
FIG. 3(e) shows the fifth iteration in which an example is seen of moving flow.

In the third step, since A is now saturated, the graph of FIG. 3(c) has three nodes. The cost of adding the traffic from node D to node A is 40. The longest path is 80, thus the traffic is added from D to B, setting U to 220. In the fourth step shown in FIG. 3(d), add 10 Kpbs of flow is added from C to B. In step 5 of FIG. 3(e), the first example is seen of moving flow. Rather than adding 10 Kbps of flow from C to F at a cost of 75, it is better to first move the flow from C to B and then move the flow off of B onto C. As with the previous algorithm, not all of the stages are illustrated for the execution, but the remaining ones are left to the reader.

Shortest Path (SP) algorithms such as Dijkstra are well known (see the Harary book, cited above), but Longest Path (LP) algorithms are not as well known. There is a good reason for this. In general, LP problems are of exponential complexity. What saves this particular case is the special structure of the graph. It is possible to solve the LP problem for an auxiliary graph of node n b n−2 executions of Dijkstras algorithm. Since each Dijkstra run is of complexity $O(n^2)$, the total complexity of finding the longest path from S to Fin is $O(n^3)$.

Numeric Results

The previously introduced algorithms can be used to examine various simple network problems and give some insight into cost estimates. The model of Squareworld is used, which was introduced in the book by R. Cahn entitled "Wide Area Network Design: Concepts and Tools for Optimization", published by Morgan Kaufmann, 1998. Squareworld is a 1000 mile by 1000 mile region in the United States. This lends itself to simple generation of network problems.

Begin by assuming that the bandwidth cost is a simple linear function. 1 Kbps of bandwidth will cost 0.50 plus 0.10 per 100 km. Generate traffic at the nodes using a profile shown below:

```
2                    /*  2 types of nodal traffic */
10000 10000 0.5      /*  50% of the nodes have 10 Kbps in and
                         10 Kbps out */
```

| | | | |
|---|---|---|---|
| 20000 20000 0.5 | /* | 50% of the nodes have 20 Kbps in and 20 Kbps out */ | |

Figure 4:
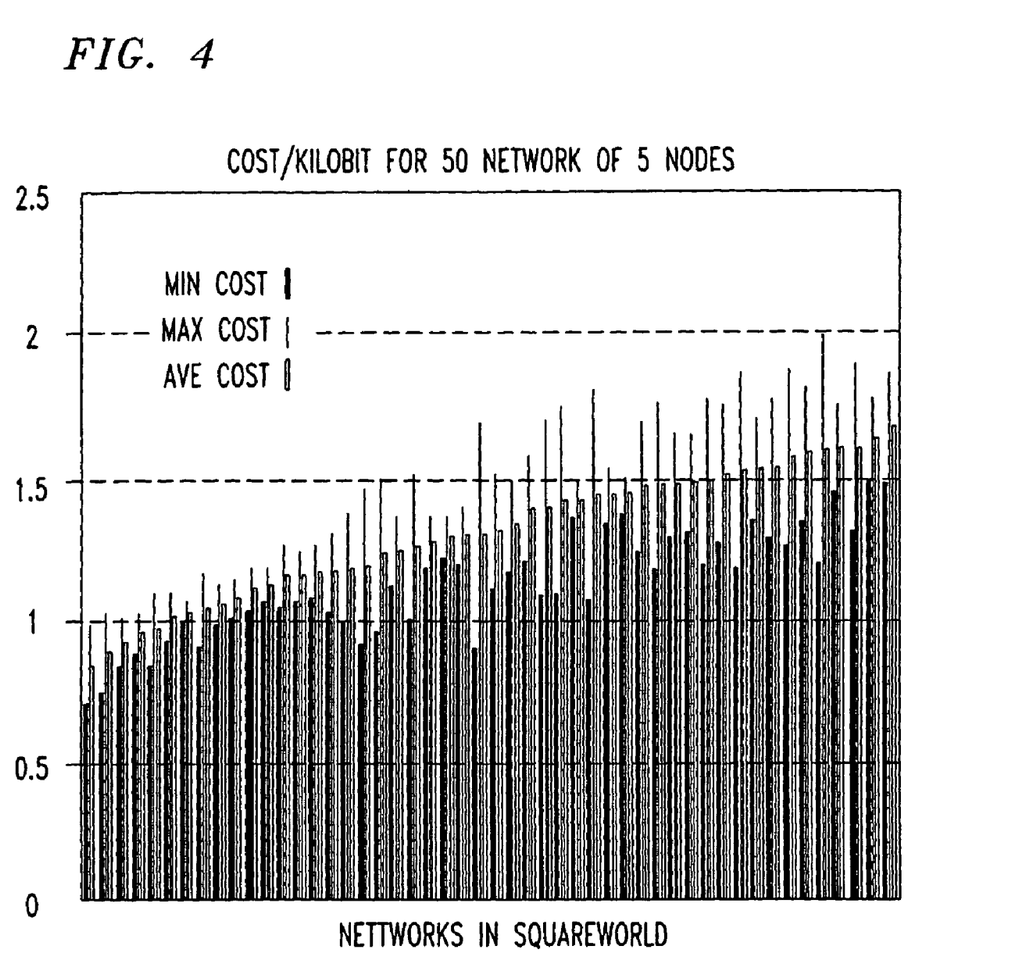
FIG. 4 shows the results as a plot of the number of networks vs. the cost per kilobit for fifty networks of five nodes each.

There are two types of traffic since these cases were used to debug the code and with one type of traffic the path through the code becomes simple matching of nearest and furthest neighbors. The results for 50 test runs are shown in FIG. 4, which is a plot of the number of networks vs. the cost per kilobit for 50 networks of five nodes.

The average cost runs anywhere from $0.835/Kbps to $1.665/Kbps showing that the ratio of the most expensive case is about twice the least cost case.

It is interesting to see what happens as the number of nodes increases. In an example where 50 experiments are run with 10 nodes in Squareworld., the lower bound is decreased from the previous case. Since it is known from the tariff structure that the cost for 1 Kbps is greater than or equal to $0.50, it is seen that the lower bounds for the individual flows are still well away from that bound. With 10 nodes, the average cost per Kbps varies between $1.06 and $1.48; thus with more sites the variance is decreased.

Extensions to MPLS for International VPNs

Multi-protocol label switching (MPLS)-based VPNs do not adapt themselves particularly well to international use. Transoceanic telecommunications have cost between one and two orders of magnitude more than national telecommunications. To understand what this means for MPLS-based systems, two simple examples are reviewed. In the first model, it is assumed that there are 2n nodes that are in one country. It is assumed that $c_{ij}=1$ and that $I_i=O_i=10$ Kbps. In the second model it is assumed that nodes 1, . . . , n are in country A and that nodes n+1, . . . , n are in country Z. It is assumed that $c_{ij}=1$ if the nodes are in the same country and $c_{ij}=20$ if they are in different countries. Again, $I_i=O_i=10$ Kbps. Then if n is even, it can be can computed that $L_{Model\ 1}=U_{Model\ 1}=20n$. While $L_{Model2}=20n$, $U_{Model2}=20n$. Thus for any network with a large number of nodes on both sides of an ocean, the formula of Cost=α×L+(1−α)×U estimates the cost to be very large.

The solution to this problem is to use the idea of a saturated cut. If the VPN was not provisioned with MPLS but rather provided as a set of PVCs and the sole connection between the United States and Europe was a 30 Kbps PVC, then the flow across the Atlantic would be limited by that link. The link is, in effect, a one-edge cut which disconnects the graph. If for reasons of reliability two-way connectivity is needed, replace the single PVC with a pair of PVCs, each with a committed information rate (CIR) of 15 Kbps. Then the two links still have a capacity of 30 Kbps and provide the same limit on the transatlantic flow.

To offer cost effective multi-national MPLS-based networks, it will be necessary to modify MPLS to provide cut limits. The network will need, in effect, to not allow the flow between two sets of nodes to exceed a limit. Without this architectural addition, the cost (and thus the price) of such MPLS-based VPNs will be prohibitive to the customer or risky to the provider.

It is easy to modify the algorithms for computing L and U to take a cut constraint into account. This will result in a radical decrease in U and usually will involve no change to L at all. The algorithm to calculate U would then be:

1. Set U=0.
2. Let $S_1$ and $S_2$ be the two sets of nodes created by the cut.
3. Loop until the cut is saturated.
   (a) Find $(s_1, s_2)$ $S_1 \times S_2$ such that $C_{s1, s2}$ is maximal, $_{s1}$ can source additional flow and 82 has additional sink capacity.
   (b) $U+=c_{s1, s2} \times Fl$.
   (c) $O_{s1}-=Fl \cdot I_{s2}-=Fl$.
4. End of loop.
5. Compute $U_1$, the upper bound for the problem restricted to $S_1$.
6. Compute $U_2$, the upper bound for the problem restricted to $S_2$.
7. $U+=U_1+U_2$.

The algorithm assigns the cut flow and then computes an upper bound for each side of the cut. While this does not produce a least upper bound, it is adequate for the purposes of estimating the tariff.

Although a specific embodiment of the invention has been disclosed, it will be apparent to those having skill in the art that changes may be made to the specific embodiment without departing from the spirit and the scope of the invention.

What is claimed is:

1. A computer readable medium encoded with computer instructions that when executed by a computer processor implements a method for calculating an approximate cost of multi-protocol label switching (MPLS)-based virtual private network (VPN) services and determining a price charged for services across said VPN, said virtual private network comprising a connection between a first network node and a second network node, said method comprising:
   computing a greatest lower bound for a bandwidth used across said connection in said MPLS-based VPN;
   computing a least upper bound for the bandwidth used across said connection in said MPLS-based VPN;
   determining a weighted upper bound based on a measure of risk and said least upper bound;
   determining a weighted lower bound based on said measure of risk and said greatest lower bound;
   combining said weighted upper bound and said weighted lower bound to produce an estimate for the cost of the bandwidth used across said network connection,
   determining the price charged for services provided across said VPN based on said cost.
2. The computer readable medium of claim 1, wherein the computing a least upper bound includes a cut constraint.

* * * * *